Patented Jan. 3, 1933

1,893,310

UNITED STATES PATENT OFFICE

FREDERICK W. von SANDEN, OF SEATTLE, WASHINGTON

WOOD PRESERVER COMPOSITION

No Drawing.   Application filed February 17, 1930. Serial No. 429,201.

This invention relates to wood preserver compositions and the objects of the invention are to provide a preserver composition that may be applied to any kind of wood and which will preserve the wood while it is under either salt or fresh water or exposed to the air. The composition may be smeared on with a brush or forced into the wood by pneumatic pressure, and by adding any desired coloring matter it may additionally serve as a paint.

My composition consists of a mixture of lime water, gum, mineral or vegetable oil, creolin, paraffin oil and muriatic acid. I usually add a small amount of poison or other chemical to the composition that will prevent its attack by worms, insects, rodents and the like.

In preparing the composition I prefer to use the ingredients in approximately the following proportions—viz., one gallon of water, three pounds of lime, two pounds of African gum, one quart of oil, two ounces of creolin, four ounces of paraffin oil, two ounces of muriatic acid, and one-half pound of poison.

The lime is thoroughly dissolved in the water and the gum is thoroughly dissolved in the oil at or above the boiling point. The two solutions are then mixed together and the creolin, paraffin oil, muriate acid and poison are added. The composition will then be ready for use.

While I have specified African gum and mineral or vegetable oil in the foregoing description, it will be understood that any kind of gum and oil may be used that will dissolve when mixed together and upon the proper application of heat.

It will also be understood that the proportions of all the ingredients of the composition may be varied as much as twenty-five per cent from those stated and still give good results. I also sometimes leave out either the muriatic acid or the creolin and sometimes both and still find that good results are obtained.

Having thus described my composition, what I claim and desire to secure by Letters Patent of the United States is:—

A wood preserver composition resulting from the mixture of from three-quarters to one gallon of water, from one to three pounds of lime, from one and one-half to two pounds of gum, from three-quarters to one quart of unctuous substance selected from the groups consisting of mineral and vegetable oils, from one and one-half to two ounces of creolin, from three to four ounces of paraffin oil, from one and one-half to two ounces of muriatic acid, and from one-quarter to one-half pounds of poison.

In witness whereof, I hereunto subscribe my name this 4th day of December, A. D. 1929.

FREDERICK W. von SANDEN.